Aug. 15, 1933.  F. H. DUNBAR  1,922,886
PRESSURE APPLYING MECHANISM
Filed Nov. 28, 1931   2 Sheets-Sheet 1
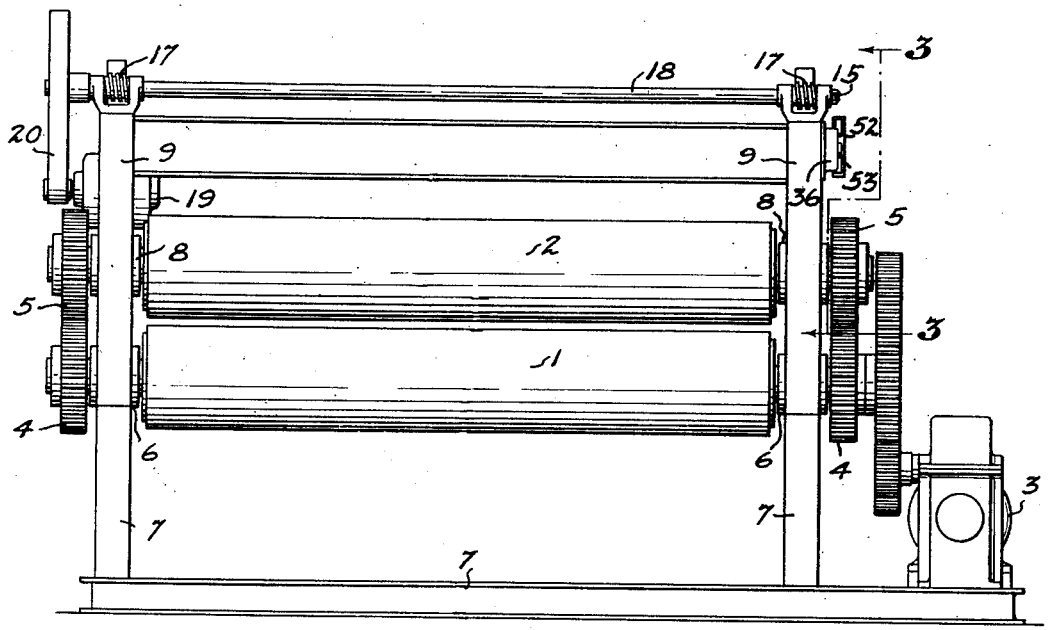
Fig. 1.
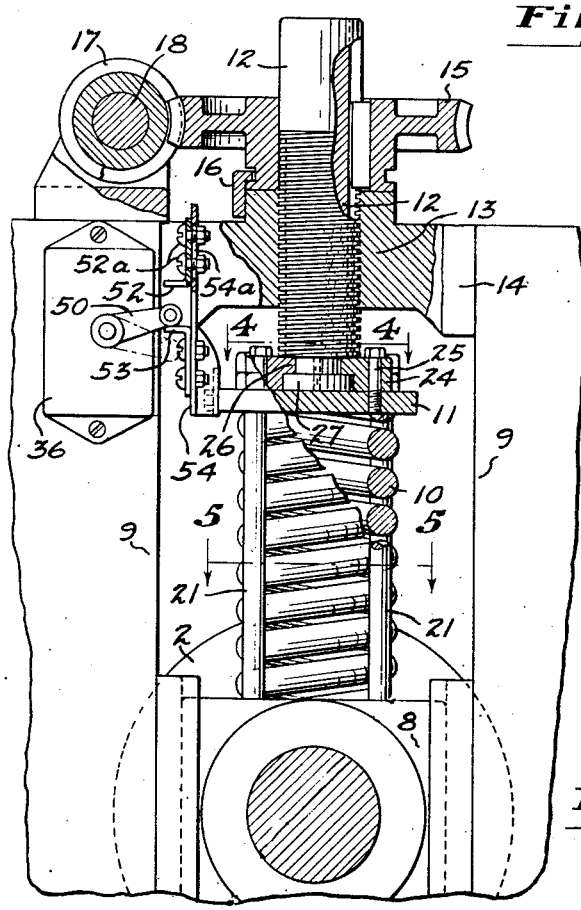
Fig. 3.
Fig. 2.
INVENTOR
Frank H. Dunbar
BY  Evans & McCoy
ATTORNEY Aug. 15, 1933.  F. H. DUNBAR  1,922,886
PRESSURE APPLYING MECHANISM
Filed Nov. 28, 1931   2 Sheets-Sheet 2
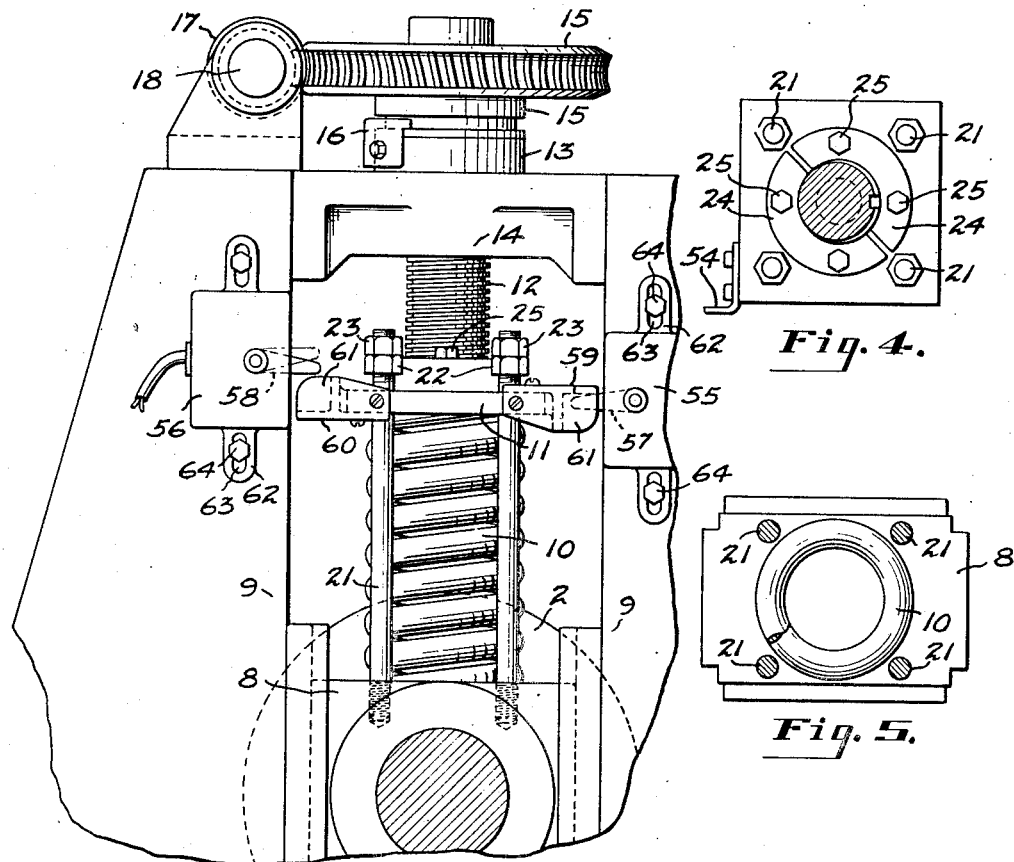
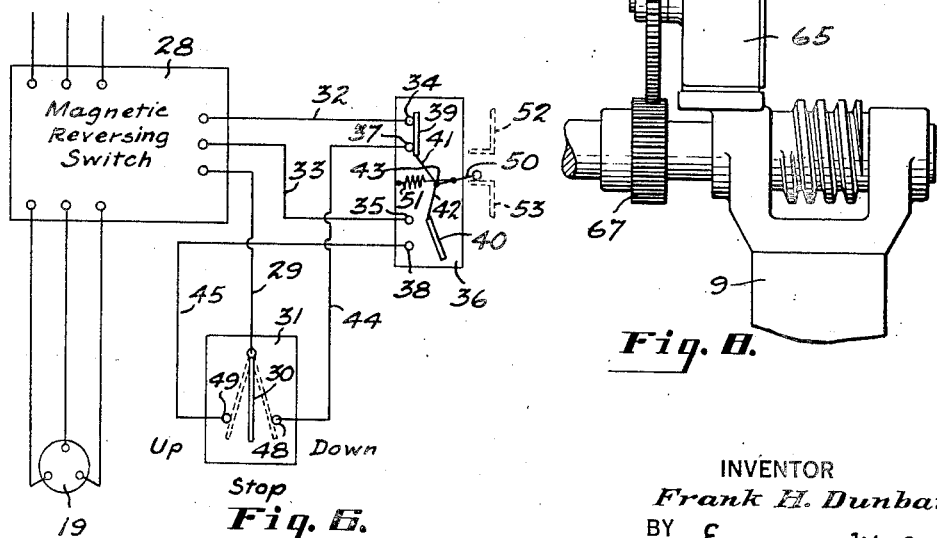
INVENTOR
Frank H. Dunbar
BY Evans & McCoy
ATTORNEY Patented Aug. 15, 1933　　　1,922,886

UNITED STATES PATENT OFFICE 1,922,886

PRESSURE APPLYING MECHANISM

Frank H. Dunbar, Chagrin Falls, Ohio

Application November 28, 1931
Serial No. 577,778

18 Claims. (Cl. 68—32)

This invention relates to a power operated pressure applying device which is particularly applicable to rug and carpet wringing machines or machines of similar type in which a presser element is shifted into and out of pressure applying position.

In previous machines of the character above referred to, the shifting and pressure applying has been done by manual effort and this invention provides a means for performing this operation more easily, more accurately and with greater rapidity by means of a power operated, automatically controlled mechanism.

The present invention has for an object to provide a power actuated mechanism comprising power operated thrust applying mechanism connected to a presser element through a yieldable thrust transmitting device such as a spring, and means controlled by a movement of a part of the thrust applying mechanism to stop the mechanism automatically in a predetermined position, at which position a predetermined pressure is exerted on the presser element.

A further object is to provide a yieldable thrust transmitting member in the form of a spring so held in a cage that it is maintained under an initial compression so as to reduce the amount of movement of the thrust applying mechanism necessary to compress the spring to a predetermined extent so that the spring will exert a predetermined pressure on the presser element.

A further object is to provide the thrust applying mechanism with an automatic stop device which is adjustable to vary the extent of movement permitted, and to vary the operating pressure transmitted to the presser element.

A further object is to provide the spring with a cage mounted on the presser element and movable therewith, which has guide members within which the spring is mounted and a head slidable on the guide members which engages the outer end of the spring, adjustable stop members being provided on the guide members to limit the outward movement of the head, the head being attached to a movable thrust applying member.

With the above and other objects in view the invention may be said to comprise the device as illustrated in the accompanying drawings hereinafter described and particularly set forth in the appended claims, together with such variations and modifications thereof as will be apparent to one skilled in the art to which the invention appertains.

Reference should be had to the acocmpanying drawings forming a part of this specification, in which:

Fig. 1 is a front elevation of a wringing machine to which the invention is applied;

Fig. 2 is an end elevation of the machine;

Fig. 3 is a sectional view on an enlarged scale taken on the line indicated at 3—3 in Fig. 1, portions being broken away to show the worm wheel and nut in axial sections;

Fig. 4 is a section taken on the line 4—4 in Fig. 3;

Fig. 5 is a section taken on the line indicated at 5—5 in Fig. 4;

Fig. 6 is a diagrammatic view showing the arrangement of the motor controlling switches;

Fig. 7 is a fragmentary end elevation of the machine showing a modified form of motor controlling device;

Fig. 8 is a detail view showing a third form of motor controlling device.

In the accompanying drawings, the invention is illustrated as applied to a large wringer of the type used for wringing rugs and carpets. The wringer, as shown, consists of a stationary pressure roll 1 and a movable pressure roll 2 between which the material to be pressed is passed. The rolls may be made of any suitable material having sufficient strength. The rolls may be and are preferably covered by a resilient layer of rubber or similar material. The rolls are preferably power operated and may be driven by any suitable means such as an electric motor 3 geared to the shaft of the lower stationary roll which drives the movable roll 2 through intermeshing gears 4 and 5, fixed to the shafts of the stationary roll and movable roll, respectively.

As shown in Figs. 1 and 2, the lower roll 1 is journaled in bearings 6, which are rigidly secured in the base portion of a suitable supporting frame 7 and the upper roll 2 is journaled in bearings 8 mounted slidably between vertical guide standards 9 at opposite ends of the frame 7. Immediately over and resting upon the slidable bearings 8 are cushioning springs 10 through which downward pressure is applied to the bearings 8 of the roll 2. Pressure is applied to the springs 10 and through the springs to the bearings 8 of the roll 2 through pressure plates or heads 11 which engage the upper ends of the springs 10, and which are moved upwardly or downwardly by means of vertical screws 12 operating in nuts 13 which form a rigid part of supporting member 14 which is rigidly secured between the upper ends of the guide standards 9, the screws being rotated by means of worm wheels 15 splined to the upper ends thereof which are rotatably supported upon the frame member 14 and held against upward movement with the screw by suitable bearing members 16. In order to impart identical movements to both ends of roll 2 and exert the same pressure on opposite ends of the roll the worm wheels 15 are simultaneously driven by operating worms 17 in mesh with the worm wheels and keyed to a shaft 18 which extends longitudinally of the frame at the top thereof. The shaft 18 may be driven by any suitable means such as an electric motor 19 which has a suitable driving connection with the shaft such as the belt drive 20 shown in Figs. 1 and 2.

An important object of the present invention is to control the pressure exerted by the presser element, roll 2 in the machine illustrated. It is evident that no pressure exists between the rolls until they are brought into contact and that the change in the position of the rolls relative to each other or to a fixed point is too slight as the inter-roll pressure is increased to be utilized to operate control equipment, also the rolls separate more or less in operation depending on the varying thickness of the materials passed between them and to deformities in the rolls themselves, thereby making the accidental movement of the spring end abutting the rolls of greater magnitude than the slight motion it might obtain through compression of the roll covering, which movement might theoretically appear available for operating mechanism to control the inter-roll pressure. On the other hand the end of the spring not abutting the rolls which may be termed the free end, has a very considerable movement, readily lending itself to control uses and further when once set in proper pressure position is not affected by the movements of the roll 2 as different thickness of materials are passed between the rolls.

Since the compression of a spring is a direct function of the applied pressure, it will be apparent that when the roll 2 is resting on the roll 1, a definite and different pressure will be exerted on the roll 1 for each position of the plates 11. Knowing the scale of the spring any desired predetermined roll pressure can be obtained if the downward movement of the plates is stopped at the proper point.

In order to obtain accurate regulation of pressure and to allow the relative movement necessary between the rolls to accommodate varying thicknesses of the material passing between the rolls without too great variations of pressure, it is desirable that the springs be of a form such that their free or movable ends have a considerable range of movement between the position which they would normally assume and that to which they are moved when subjected to the working pressure. If coil springs are employed they should be of a length such that slight movements of the roll 2 toward the plates 11 will not greatly increase the pressure. If the spring has a range of movement sufficient to properly cushion the roll, movement of the screws 12 necessary to allow the spring to assume its normal position and relieve the pressure is greater than desirable. In order to avoid this difficulty means is provided for limiting the movement of the plates 11 away from the bearing 8 at positions such that each of the springs is held under a predetermined initial compression.

As shown in Figs. 3 and 4, each plate 11 is slidably mounted on tie rods 21 which are rigidly attached at their lower ends to the bearing 8 and which are arranged to provide a cage for the spring 10. Each of the plates is provided with holes to receive the tie rods 21 and the tie rods are provided at their upper ends with nuts 22 against which the plates are normally held by the springs and which are adjustable to increase or decrease the initial compression of the spring, lock nuts 23 being provided to positively hold the nuts 22 in adjusted positions.

The plates 11 are attached to the lower ends of the screws 12 for linear movement with the screws so that upward movement of the screws 12 will lift the upper roll 2 out of contact with the roll 1, thus preventing flattening of the roll coverings when the machine is idle. Each plate 11 is attached to a screw 12 by means of a pair of semicircular undercut bearing members 24 which are secured to the plate 11 by bolts 25 and which have flanges 26 which overhang a circumferential flange 27 on the lower end of the screw permitting the screw to rotate in the bearing but constraining the plate to move vertically with the screw.

By mounting the compression springs 10 in a cage in which they are held under an initial compression the height of the machine frame may be considerably reduced due to the fact that the springs are never allowed to assume their normal length, and due to the fact that the longitudinal movement of the screws necessary to apply the desired pressure is reduced. For instance, assume that springs are employed whose compression rate is 1000 pounds per inch of compression and a working pressure of 10,000 pounds is desired on each bearing. If the spring were not compressed initially it would be necessary to provide a movement of 10 inches for plates 11, whereas by initially compressing the spring in the cage to a length 5 inches less than its normal length there will be a self contained pressure between the plates 11 and bearings 8 of 5000 pounds. As soon as a plate 11 is forced downward the slightest distance away from the nuts 22 on the tie rods, this pressure of 5000 pounds will be transmitted to the bearing 8 and a further movement of 5 inches only will produce the required pressure of 10,000 pounds. It is obvious that the height of machine has been reduced by 5 inches and that the time required to produce the required pressure by actuation of the screws has been cut in half. It is to be understood that the above figures are given merely for purposes of explanation and that the amount of initial compression of the spring and the working pressure may be varied as may be advisable for the particular machine to which the invention is applied.

The range of movement of the screws 12 is sufficient to permit the screws to lift the roll 2 bodily out of contact with the roll 1 and to force the plates 11 downwardly after the roll 2 has been lowered into contact with the roll 1 a distance sufficient to apply the desired pressure to the roll. The screws are actuated in a downward direction until the plates 11 have been brought to a position in which the desired working pressure is exerted upon the springs 10, whereupon the rotation of the screws is stopped and the springs, due to their compression, continue to exert the predetermined pressure on the roll 2.

Assuming that the screws have a fixed upper limit of movement, it will be apparent that the distance the screws will have to move downwardly to put the desired pressure on the springs may be accurately predetermined. The screws 12 and plates 11 will have a linear movement which may be exactly determined for a given working pressure and to impart this linear movement the screw must make a predetermined number of turns and the shaft 17, which drives the screws, must also make a predetermined number of revolutions. It will be apparent, therefore, that the power operated pressure applying mechanism may be automatically controlled to stop the rotation of the screws at upper and lower limits of movement by means of suitable controlling devices actuated either by a member which has linear movement with the screw or by a member which is geared to the screw and driving shaft so that it has a movement proportional to the rotary movement of the screws.

The means employed for starting, stopping and controlling the direction of rotation of the shaft 17 will depend upon the nature of the driving mechanism. As herein shown, the automatic control is applied to the electric motor 18 which drives the screw operating shaft 17.

Referring to Fig. 6, the motor 19 is directly controlled by a magnetic reversing switch 28 of well known construction which is not illustrated in detail. One terminal of each of the two actuating solenoids of the reversing switch are connected by a line 29 to the movable arm 30 of a manually operable master switch 31 and the opposite terminals of the solenoids are connected by lines 32 and 33 with fixed contacts 34 and 35 of a snap switch 36. The snap switch 36 has two additional stationary contacts 37 and 38 which are spaced from the contacts 34 and 35, respectively, and the contacts 34 and 37, 35 and 38 are adapted to be alternately bridged by contact members 39 and 40 carried by oppositely extending arms 41 and 42 of a pivoted switch member 43. The fixed contacts 37 and 38 are connected by lines 44 and 45 to fixed contacts 48 and 49 of the master switch 31 positioned on opposite sides of the switch arm 30 which is adapted to occupy a neutral position out of engagement with both contacts or a position in engagement with either one of the contacts 48 and 49.

It will be apparent either one of the solenoids circuits can be closed by the master switch only when the circiut is completed through one of the movable contact members of the snap switch. The movable element of the snap switch is provided with an outwardly extending arm 50 and has a spring 51 so connected thereto that the switch element will be snapped in either direction to bridge one pair of contacts or the other when a switch element is shifted by means of the arm 50 in either direction past dead center position. The snap switch 35 may be mounted as shown in Fig. 3 on one of the standards alongside one of the screws 12 with its trip arm 50 positioned between upper and lower trip members 52 and 53 attached to a bracket 54 which is fixed to the plate 11. The lower trip member 53 is so positioned that it will actuate the trip arm 50 at the desired upper limit of movement of the screws and the upper trip member 52 is mounted for vertical adjustment on the bracket 54 by means of bolts 52a engaging in a vertical slot 54a in the bracket so that it may be secured in an adjusted position where it will actuate the trip arm 49 at the desired point of downward movement of the screw to stop the screws when they have reached the point at which the desired pressure is exerted on the spring 10.

It will be apparent that the solenoid circuits are completed through the master switch 31 and that the motor may be stopped at any time by moving the arm 30 of the master switch to neutral position. When the screws 12 are in their uppermost positions the snap switch 36 bridges the contacts 34 and 37 and the motor may be started in a direction to move the screws downwardly by shifting the contact arm 30 of the master switch 31 into engagement with the stationary contact 48. When the screw reaches its downward limit of movement the trip arm 52 shifts the snap switch away from the contacts 34 and 37 to a position where it bridges the contacts 35 and 38, breaking the circuit previously completed through the master switch 31 and stopping the motor. Whenever it is desired to raise the roll 2, the motor may be actuated in a direction to move the screws upwardly by shifting the switch arm 30 of the master switch 31 over into engagement with the contact 49. For convenience the three positions of the contact arm 30 are preferably marked "Up", "Stop" and "Down", so that the operator can readily see in which direction the arm should be moved.

No damage can result from wrong actuation of the manually operated master switch since the circuits of the motor are connected in series through the snap switch and master switch and the motor can be actuated only in the direction for which the snap switch is set.

While the machine is in operation the screws remain stationary, holding the plates 11 in a position such that the desired pressure is maintained on the roll 2 by the springs 10. Whenever it is desired to discontinue the pressure the arm 30 is moved into engagement with the up contact and the motor will start in a direction to move the screws 12 upwardly, which movement will continue until the trip member 53 shifts the arm 50 and reverses the position of the snap switch.

In Fig. 7 of the drawings there is shown a modified form of motor control in which two circuits controlling the operation of the motor in opposite directions are opened and closed by means of two switches 55 and 56 mounted on the frame standards 9 alongside one of the screws 12. The switch 55 has a pivoted actuating arm 57 which projects laterally and which closes its circuit when moved upwardly and opens its circuit when it is moved downwardly. The switch 56 has a laterally projecting actuating arm 58 which closes its circuit when moved downwardly and which opens its circuit when moved upwardly. The arm 57 is positioned in the path of a trip arm 59 attached to the plate 11 and is below the trip member 59 so that it will be opened to stop the motor when the plate 11 has been moved downwardly to a predetermined point. The arm 58 is positioned in the path of a second trip member 60 attached to the plate 11 and is above the trip member 60 so that it will be opened to stop the motor when the plate 11 has been moved upwardly to a predetermined point.

When the screw is at its upper limit of movement the motor may be started in a direction to move the screw downwardly by manually shifting the switch arm 57 upwardly. The motor then will continue to operate until the switch arm 57 is swung down to open position by the trip member 59. To raise the roll the switch arm 58 is normally moved down to its circuit closing position to start the motor in the reverse direction and the upwardly moving trip member 60 moves the arm 58 upwardly to its open position to stop the motor when the plate 11 has reached a predetermined position.

In order to prevent inadvertent or improper actuation of the wrong switch manually the trip members 59 and 60 may be provided with guard flanges 61 which alternately cover the switch arms 57 and 58 leaving exposed only the switch arm which should be actuated manually to start the motor in the proper direction.

In order to vary the extent of movement of the screws the limit switches 55 and 56 may be mounted for vertical adjustment on the frame. As herein shown the switch boxes are provided at their upper and lower ends with attaching lugs 62 which have elongated slots 63 to receive attaching bolts 64.

It will be apparent that, inasmuch as the linear movement of the screws 12 is directly proportional to their rotational movement, the motor or other actuating mechanism may be controlled by suitable limit switches tripped by members actuated by any rotating element of the screws driving mechanism and so arranged as to actuate the limit switches after a predetermined rotational movement of the rotating element. For instance, in Fig. 8 there is shown a rotary limit switch 54 of a well known type which may be purchased complete and which is adapted to stop the motor in a manner similar to control device previously described, the trip actuating member in this case being a rotary element which actuates a snap switch at its opposite limits of movement. As shown in Fig. 8 the rotary limit switch 65 is mounted upon the upper end of the standards at one end of the machine and the rotary elements thereof are geared to the shaft 18 through a gear 66 meshing with a gear 67 fixed to the shaft 18.

It is to be understood that the device of the present invention is applicable to various machines where it is desired to apply a predetermined pressure through elastic cushioning means and that the number of pressure applying screws geared together for simultaneous movement is immaterial. In some cases a single screw and spring may be sufficient.

It will be apparent that the present invention provides a very simple and reliable mechanism for quickly and easily applying a desired predetermined pressure to a presser element and that the pressure applying mechanism is so constructed that it requires a relatively small amount of movement of the thrust applying member to apply an accurately predetermined pressure to the presser element or to release the pressure and move the presser element to an inoperative position.

It will also be apparent that the device of the present invention provides the presser element of a machine such as a wringer with a cushioning device which will permit yielding of the presser roll without objectionably increasing the pressure on the material passing between the rolls.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. The combination with a frame having a presser element movably mounted therein, of a power actuated pressure applying mechanism comprising a movable thrust member mounted in the frame for movement toward and away from said presser element, means forming an elastic cushion between the thrust member and presser element, and power transmitting means mounted on the frame for moving the thrust element toward the presser element to apply pressure thereto, means controlled by a moving part of the pressure applying mechanism for automatically stopping the movement of the thrust member toward the presser element at a predetermined point, and means for adjusting the automatic controlling means to stop the thrust member at different distances from the presser element thereby varying the compression of the cushioning means.

2. The combination with a frame having a presser element movably mounted therein, of a power actuated pressure applying mechanism comprising a thrust applying screw, mounted in the frame for endwise movement, a nut in threaded engagement with the screw and rotatably mounted on the frame, a spring interposed between the screw and presser element, and driving means for effecting relative rotation between the screw and nut to move the screw endwise in the frame, and means controlled by a moving part of the pressure applying mechanism for automatically stopping the endwise movement of the screw toward the presser element at a predetermined point whereby said spring may be subjected to a predetermined compression.

3. The combination with a frame having a presser element movably mounted therein, of a power actuated pressure applying mechanism comprising a thrust applying screw mounted in the frame for endwise movement, a nut in threaded engagement with the screw and rotatably mounted on the frame, a spring interposed between the screw and presser element, and driving means for effecting relative rotation between the screw and nut to move the screw endwise in the frame, means controlled by a moving part of the pressure applying mechanism for automatically stopping the endwise movement of the screw toward the presser element at a predetermined point whereby said spring may be subjected to a predetermined compression, and means for adjusting said automatic means to stop the endwise movement of the screw at different distances from the presser element to vary the pressure exerted by the spring on the presser element.

4. The combination with a frame having presser element movably mounted therein, of a spring cage carried by the presser element, said cage having a movable outer head and a spring interposed between the head and presser element, said cage having means for guiding said head and adjustable means associated with the guiding means for limiting the outward movement of the head and for moving the head inwardly to apply an initial pressure to the spring, a screw attached to said head, a nut mounted in the frame in threaded engagement with said screw, and driving means on said frame for effecting a relative rotation between the screw and nut to move the screw endwise in the frame and toward the presser element to apply pressure thereto through said spring.

5. The combination with a frame having presser element movably mounted therein, of a spring cage carried by the presser element, said cage having a movable outer head and a spring interposed between the head and presser element, said cage having means for guiding said head and adjustable means associated with the guiding means for limiting the outward movement of the head and for moving the head inwardly to apply an initial pressure to the spring, a screw attached to said head, a nut mounted in the frame in threaded engagement with said screw, driving means on said frame for effecting a relative rotation between the screw and nut to move the screw endwise in the frame and toward the presser element to apply pressure thereto through said spring, and means for controlling said driving means to automatically stop the screw in a predetermined position.

6. The combination with a frame having presser element movably mounted therein, of a spring cage carried by the presser element, said cage having a movable outer head and a spring interposed between the head and presser element, said cage having means for guiding said head and adjustable means associated with the guiding means for limiting the outward movement of the head and for moving the head inwardly to apply an initial pressure to the spring, a screw attached to said head, a nut mounted in the frame in threaded engagement with said screw, driving means on said frame for effecting a relative rotation between the screw and nut to move the screw endwise in the frame and toward the presser element to apply pressure thereto through said spring, means for controlling said driving means to automatically stop the screw in a predetermined position, and means for adjusting said controlling means to vary the position at which said screw is stopped.

7. In a wringing machine, a movable roll, a member with which the roll coacts, a power operated mechanism for applying pressure to the movable roll in a direction toward said member, a spring interposed between said mechanism and said roll for yieldably resisting movement of the roll away from said member by material passing between the roll and member, and means controlled by a moving part of said mechanism to stop the same in a predetermined position in which the spring is under a predetermined initial compression.

8. In a wringing machine, a movable roll, a member with which the roll coacts, a power operated mechanism, including a thrust applying screw for pressing the roll toward said member, a spring interposed between the screw and roll for yieldably resisting movement of the roll away from said member by material passing between the roll and member, and means operated by a part of said mechanism for automatically stopping the screw in a predetermined position in which the spring is under a predetermined initial compression.

9. In a wringing machine, a movable roll, a member with which the roll coacts, a power operated mechanism, including a thrust applying screw for pressing the roll toward said member, a spring interposed between the screw and roll for yieldably resisting movement of the roll away from said member by material passing between the roll and member, means operated by a part of said mechanism for automatically stopping the screw in a predetermined position in which the spring is under a predetermined initial compression, and means for adjusting said means to change the position at which the screw is stopped to vary the initial compression of the spring.

10. In a wringing machine, a movable roll, a member with which the roll coacts, mechanism including a screw and an electric motor for actuating said screw to press the roll toward said member, means providing an elastic cushion between the screw and roll for yieldably resisting the movement of the roll away from said member by material passing between the roll and member, and means for controlling said motor including a limit switch actuated by a moving part of said mechanism for stopping the screw in a position in which a predetermined initial pressure is exerted on the elastic cushion.

11. In a wringing machine, a movable roll, a member with which the roll coacts, mechanism including a screw and an electric motor for actuating said screw to press the roll toward said member, means providing an elastic cushion between the screw and roll for yieldably resisting movement of the roll away from said member by material passing between the roll and member, means for controlling said motor including a limit switch actuated by a moving part of said mechanism for stopping the screw in a position in which a predetermined initial pressure is exerted on the elastic cushion, and means for adjusting said controlling means to vary the range of movement of the screw.

12. The combination with a movably mounted presser element, of mechanism for applying pressure to said presser element comprising, a movable thrust member, a spring interposed between the thrust member and presser element and means including an electric motor for operating said thrust member, and means for controlling said motor to operate the same in either direction including a pair of switches and trip members movable with the thrust member for operating said switches to stop the motor at opposite limits of movement.

13. The combination with a movably mounted presser element, of mechanism for applying pressure to said presser element comprising, a movable thrust member, a spring interposed between the thrust member and presser element and means including an electric motor for operating said thrust member, means for controlling said motor to operate the same in either direction including a pair of switches and trip members movable with the thrust member for operating said switches to stop the motor at opposite limits of movement, and guards carried by said trip members for alternately covering said switches.

14. The combination with a frame having presser element movably mounted therein, of a spring cage carried by the presser element, said cage having a movable outer head and a spring interposed between the head and presser element, said cage having means for guiding said head and adjustable means associated with the guiding means for limiting the outward movement of the head and for moving the head inwardly to apply an initial pressure to the spring, a thrust applying member movably mounted in the frame and attached to said head, and means carried by the frame for moving said thrust applying member in the frame and toward the presser element to apply pressure thereto through said spring.

15. In a wringing machine, a frame, a movable roll having bearings slidable in the frame, thrust members mounted in the frame for movement toward and away from said bearings, a spring interposed between each bearing and its thrust member, a power operated mechanism having means for simultaneously moving said thrust members, and means controlled by a moving part of said mechanism to stop the same when the thrust members reach a predetermined position in their movement toward the bearing members whereby the springs are subjected to a predetermined initial pressure.

16. In a wringing machine, a frame, a movable roll having bearings slidable in the frame, thrust members mounted in the frame for movement toward and away from said bearings, a spring interposed between each bearing and its thrust member, a power operated mechanism having means for simultaneously moving said thrust members, controlling means including a member movable with one of the thrust members for automatically stopping said mechanism when the thrust members reach a predetermined position in their movement toward the bearing members, and means for adjusting said controlling means to vary the position at which the thrust members are stopped to increase or decrease the initial compression of the springs.

17. A wringing machine comprising a frame, a roll having bearings fixed in the frame, a second roll parallel with the first and engageable therewith, the second roll having bearings slidable in the frame towards and away from the bearings of the first mentioned roll, means for driving said rolls, screws mounted in the frame for endwise movement toward and away from the bearings of the second roll in the plane of the axes of the rolls, springs interposed between the screws and slidable bearings, mechanism for simultaneously actuating the screws, and means including a member movable with a screw for automatically stopping the endwise movement of the screws toward the bearings at predetermined points whereby said springs may be subjected to a predetermined initial compression.

18. In a wringing machine, a frame, a movable roll having bearings slidable in the frame, thrust members mounted in the frame for movement toward and away from said bearings, a power actuated pressure applying mechanism comprising a movable thrust member mounted in the frame for movement toward and away from each of said slidable bearings in the plane of the axes of the rolls, means forming an elastic cushion between each slidable bearing and its thrust member and power transmitting means mounted on the frame for simultaneously moving the thrust members toward the slidable bearings to apply pressure to the movable roll, and means controlled by a moving part of the pressure applying mechanism for automatically stopping the movement of the thrust members toward the slidable bearings whereby said springs may be subjected to a predetermined initial compression.

FRANK H. DUNBAR.